US011811853B2

(12) United States Patent
Goel et al.

(10) Patent No.: US 11,811,853 B2
(45) Date of Patent: Nov. 7, 2023

(54) SYSTEMS AND METHODS FOR CONTENT DELIVERY ACCELERATION OF VIRTUAL REALITY AND AUGMENTED REALITY WEB PAGES

(71) Applicant: Akamai Technologies, Inc., Cambridge, MA (US)

(72) Inventors: Utkarsh Goel, San Mateo, CA (US); Martin T. Flack, Denver, CO (US); Stephen L. Ludin, Mill Valley, CA (US)

(73) Assignee: Akamal Technologies, Inc., Cambridge, MA (US)

( * ) Notice: Subject to any disclaimer, the term of this patent is extended or adjusted under 35 U.S.C. 154(b) by 0 days.

(21) Appl. No.: 18/157,882

(22) Filed: Jan. 23, 2023

(65) Prior Publication Data

US 2023/0300186 A1    Sep. 21, 2023

Related U.S. Application Data

(63) Continuation of application No. 16/818,633, filed on Mar. 13, 2020, now Pat. No. 11,560,927, which is a
(Continued)

(51) Int. Cl.
*G06T 19/00* (2011.01)
*H04L 67/02* (2022.01)
(Continued)

(52) U.S. Cl.
CPC ........... *H04L 67/02* (2013.01); *G06F 40/143* (2020.01); *G06T 13/80* (2013.01); *G06T 19/006* (2013.01);
(Continued)

(58) Field of Classification Search
None
See application file for complete search history.

(56) References Cited

U.S. PATENT DOCUMENTS

| 9,106,607 | B1 * | 8/2015 | Lepeska ............. H04L 67/5681 |
| 10,630,797 | B2 | 4/2020 | Goel et al. |
| 11,560,927 | B2 | 1/2023 | Goel et al. |

OTHER PUBLICATIONS

U.S. Appl. No. 15/883,893, filed Jan. 30, 2018 now U.S. Pat. No. 10630797 issued on Apr. 21, 2020.
(Continued)

*Primary Examiner* — Nicholas R Wilson

(57) ABSTRACT

Among other things, this document describes systems, devices, and methods for improving the delivery and performance of web pages authored to produce virtual reality (VR) or augmented reality (AR) experiences. In some embodiments, such web pages are analyzed. This analysis may be initiated at the request of a content server that receives a client request for the HTML. The analysis may involve, asynchronous to the client request, loading the page into a non-user-facing browser environment and allowing the VR or AR scene to execute, even including executing animation routines for a predetermined period of time. Certain characteristics of the scene and of objects are thereby captured. Based on this information, an object list ordered by loading priority is prepared. Consulting this information in response to subsequent requests for the page, a content server can implement server push, early hints and/or other delivery enhancements.

11 Claims, 10 Drawing Sheets

Related U.S. Application Data continuation of application No. 15/883,893, filed on Jan. 30, 2018, now Pat. No. 10,630,797.

(51) Int. Cl.
| | |
|---|---|
| *G06T 13/80* | (2011.01) |
| *H04L 7/10* | (2006.01) |
| *G06F 40/143* | (2020.01) |
| *G06V 30/413* | (2022.01) |
| *H04L 67/55* | (2022.01) |
| *H04L 67/568* | (2022.01) |

(52) U.S. Cl.
CPC ............. *G06V 30/413* (2022.01); *H04L 7/10* (2013.01); *H04L 67/55* (2022.05); *H04L 67/568* (2022.05)

(56) References Cited

OTHER PUBLICATIONS

U.S. Appl. No. 16/818,633, filed Mar. 13, 2020 soon to issued as U.S. Pat. No. 11,560,927 on Jan. 24, 2023.
Letter titled "Communication Under MPEP § 609.02", submitted with this SB08, dated Jan. 23, 2023, 2 pages.

* cited by examiner

SYSTEMS AND METHODS FOR CONTENT DELIVERY ACCELERATION OF VIRTUAL REALITY AND AUGMENTED REALITY WEB PAGES

This patent document contains material which is subject to copyright protection. The copyright owner has no objection to the facsimile reproduction by anyone of the patent document, as it appears in Patent and Trademark Office patent files or records, but otherwise reserves all copyright rights whatsoever.

BACKGROUND

Technical Field

This application relates generally to system and methods for improving the delivery and performance of WebVR and WebAR pages.

Brief Description of the Related Art

Virtual reality (VR) is an immersive experience in which computer generated imagery surrounds a viewer. Special hardware, typically stereoscopic headsets, may be used to present three-dimensional imagery to the viewer. Examples of VR hardware include HTC Vive, Oculus Rift, Google Cardboard.

WebVR is an open specification and JavaScript API that enables VR through a web browser such as Mozilla Firefox. WebVR enables web browsers to generate immersive VR experiences within a webpage by gaining access to a VR hardware's sensory data, such as viewer position and orientation data. WebVR supports rendering of three-dimensional objects inside a 3D-enabled Document Object Model (DOM) that virtually exists within a webpage. WebVR is a cross platform technology, and hence can be used to generate Virtual Reality-capable websites to be viewed via Web browsers opened inside commercial VR devices, such as the HTC Vive, Oculus Rift, or Google Cardboard.

Augmented Reality (AR) is technology that superimposes computer-generated virtual objects onto the visible natural world. AR differs from VR in that with AR virtual objects are superimposed on real world objects, such as a virtual car placed in front of a live camera feed coming from user's device to provide the user an illusion as if the car is there in the real world. In the case of VR, virtual objects are superimposed on other virtual objects. Despite the name, WebVR specifications and API can be used to provide web pages that provide an AR experience. Hence, in this patent document, it should be understood that references to WebVR web pages, WebVR resources, WebVR scripts, or other content can produce either VR or AR presentations. Put another way, WebVR should be read as WebVR/AR.

The delivery and performance of VR/AR web pages can be enhanced to some extent through known and generally applicable techniques for web content, such as caching, transport layer optimizations, and the like. However, there is room for improvement. This patent document discloses enhancements, many of which are specific to VR/AR and/or WebVR, that improve the delivery and performance of web pages authored to produce VR/AR experiences. As such they improve the operation of the computer hardware and software, networked systems, and distributed computer systems (such as content delivery networks or CDNs) that deliver virtual reality content. Those skilled in the art will understand these and other improvements from the teachings hereof.

BRIEF SUMMARY

Among other things, this document describes systems, devices, and methods for improving the delivery and performance of web pages that are authored to produce virtual reality (VR) or augmented reality (AR) experiences, including in particular (but without limitation) web pages leveraging the WebVR toolkit.

In some embodiments, such VR/AR-enabled web pages are asynchronously analyzed in an analytical environment. This analysis may be initiated at the request of a content server that receives a client request for the HTML associated with the page and determines that the page has not yet been analyzed (or has not been analyzed recently).

The asynchronous analysis may involve loading the page into a non-user-facing browser application and allowing the scene to execute its initial animation routines for a predetermined period of time (e.g., 3 seconds). The analytical environment, preferably running on an analysis server, then captures certain characteristics of the scene and of objects therein. In some implementations, the analysis server may inject a script (e.g., javascript) into the webpage's HTML to capture certain page characteristics as it is loaded, or to otherwise assist with the analysis.

A wide variety of characteristics may be captured. Examples include information about those objects in the initial or subsequent field of view of a user, object size, object apparent size and distance in the scene, and others. Based on this information, the analysis server can prepare a list ordered by the priority of objects, that is, the order in which the objects should be loaded in order to display the VR/AR scene quickly. In some embodiments, this is referred to as an object loading list or OLL.

This list can be stored for later use. This mean that, subsequently, when a content server receives a client request for the VR/AR web page HTML and finds that the page has already been analyzed (e.g., due to the existence of an OLL), the content server can retrieve the corresponding OLL.

The content server can use the list to improve content delivery for the VR/AR enabled web page. This can be done, for example, by prefetching the objects on the list to the content server. In addition, the content server can improve delivery by, for example, pushing the objects on the list in order using the push function of HTTP/2; that is, the content server can send push promise frames to the client for the object on the list. In other embodiments, Early Hints for the objects can be used.

A variety of other enhancements are described herein.

The foregoing is a description of certain aspects of the teachings hereof for purposes of illustration only; it is not a definition of the invention. The claims define the scope of protection that is sought, and are incorporated by reference into this brief summary.

BRIEF DESCRIPTION OF THE DRAWINGS

The invention will be more fully understood from the following detailed description taken in conjunction with the accompanying drawings, in which.

DETAILED DESCRIPTION

Figure 1:
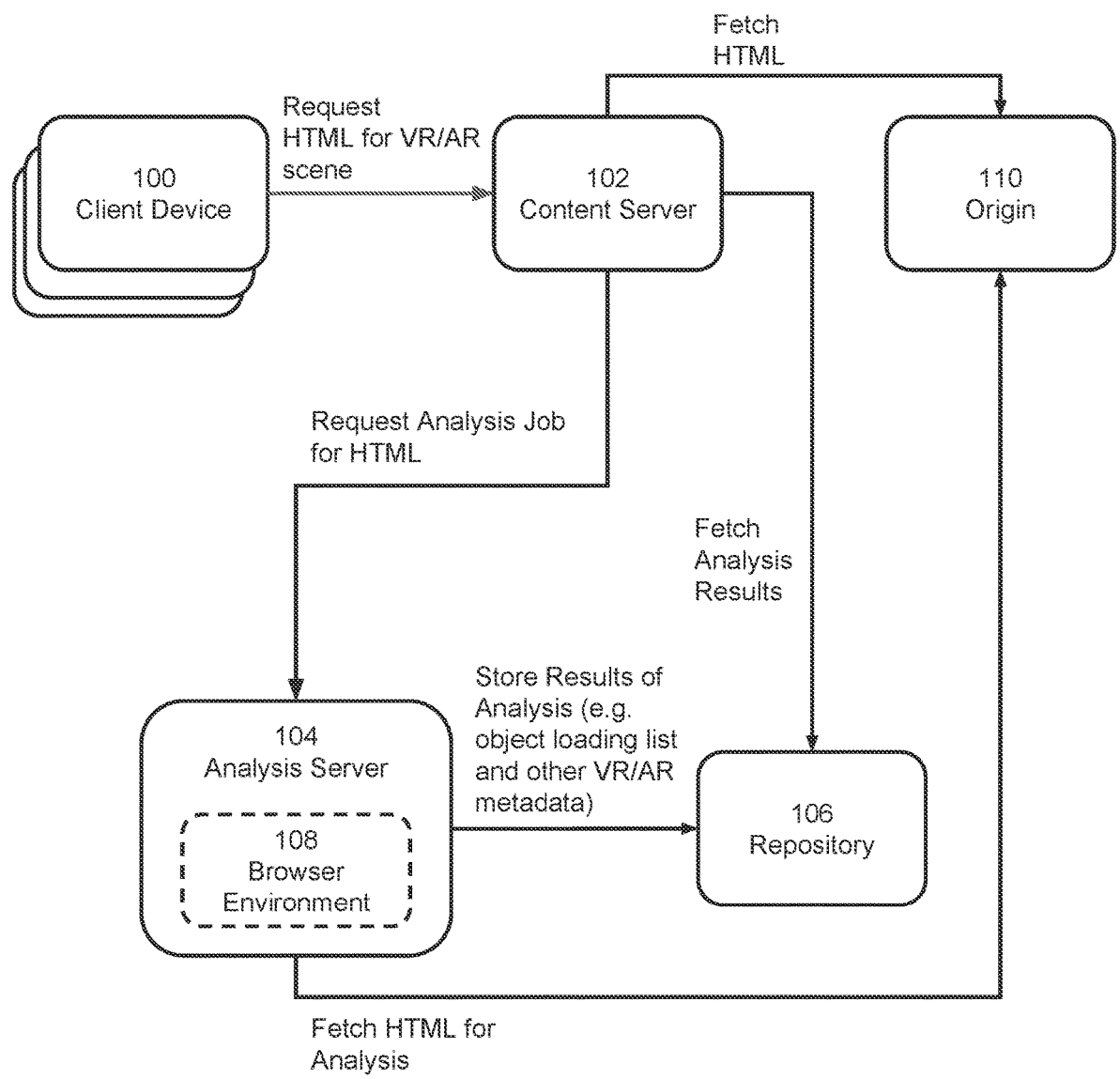
FIG. 1 is a diagram illustrating a system for VR/AR web page analysis.

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any description of advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a presentation defined by an HTML or other markup language document, preferably with embedded or inlined objects referenced therein. The term VR web page or VR page is meant to refer to a web page that is authored to produce a VR experience, such as by using VR enhancements like WebVR tags, attributes, or functionality. Hence the prominent example of a VR page in this patent document is a WebVR web page. The term AR web page or AR page is meant to refer to a web page that is authored to produce an AR experience. Because WebVR can be used to produce AR experiences, e.g., by using WebVR tags, attributes, or functionality to define objects in a scene with a background from a live feed camera, a prominent example of an AR page is also (but not limited to) a WebVR web page. It should be understood, however, that the innovative teachings described in this document are not limited to any toolkit for creating VR/AR scenes, but rather apply broadly to the creation of VR/AR experiences.

WebVR may mean using WebVR-related specifications, content, HTML tags, HTML attributes, APIs, javascripts, directives and/or other content.

References to a client request for a WebVR web page's HTML, are intended to refer to the client's request for the HTML document that leverages WebVR. Other markup language may be used. The WebVR HTML document typically refers to objects (e.g., vie embedded reference) using suitable WebVR HTML tags and HTML attributes.

INTRODUCTION

Assume a HTML document with several embedded resources that contains WebVR content to create a VR/AR experience. WebVR resources are generally requested in the order that a browser parses them in the HTML, without the notion of prioritizing resources. This patent document proposes to intelligently prioritize the serving of objects in VR/AR web pages based on various object characteristics. This means that certain objects, such as those that are in the user's initial field-of-view, may be prioritized such that they are served before others, and thereby available for loading in the browser before others. Prioritization may also mean that a delivery order is specified for some or all of the objects in the scene, with the prioritized objects higher in the list, of course.

Once a content server determines that there is an ordered list of objects, it can prefetch the objects, for example, from the origin or other content servers in the same PoP. Once a content server determines the order of objects, it can enforce the order by sending a PUSH_PROMISE for each object right after the server receives the client's request for the HTML. The server could alternatively (e.g., if push is not supported) or in combination use Early Hints. This and other techniques, described below, allow a content server to exert at least some control of when and how different elements of the VR/AR scene are downloaded and rendered on the client.

System

FIG. 1 provides a diagram of one embodiment of a system for analyzing VR/AR presentations, including in particular WebVR presentations. The client device 100 issues requests (e.g., HTTP 'Get' requests) to the content server 102 for VR/AR enabled HTML documents and resources embedded in the HTML document in a known manner. The content server 102, which preferably is a caching reverse proxy server in a content delivery network (CDN) retrieves the HTML from an origin server 110 in a forward request operation, as known in the art. The content server can determine that the HTML makes use of WebVR or other VR/AR toolkit, e.g., via configuration that labels the requested URL as being for VR/AR, or inspection to discover the use of WebVR, WebVR attributes, or other content indicative of WebVR or VR/AR. The content server 102 sends the URL for the HTML to the analysis server 104 and requests that the analysis server 104 perform an analysis on it. This analysis is sometimes referred to as an 'offline' analysis, and it typically occurs asynchronous to the client-content server message exchange. An example of a system for 'offline' analysis of a web page is described in U.S. Pat.

No. 8,788,577, the teachings of which are hereby incorporated by reference in their entirety.

The first time that an HTML document is requested by a client, the results of the asynchronous analysis will not be ready; hence the content server 102 serves the HTML to the client as-is.

The analysis server's 104 role is to analyze HTML documents and specifically the VR/AR scene therein, to produce analytical results that can be used by the content server 102 to enhance the delivery of the VR/AR page for subsequent client requests. Preferably, the analysis server 104 accomplishes this by retrieving the HTML from the origin 110 (unless the content server 102 sent it with the analysis request), and loading it into an internally executing browser environment 108. This means that the HTML and associated objects are loaded just as they would be in an end-user browser, and the initial VR/AR scene rendered, and possibly any initial animation executed. Of course, there is no end user display. A headless browser (e.g., headless Chrome) can be used to implement this environment, although that is merely one option. Rather the analysis server 104 monitors the loading of the page and extracts certain information during the process. This can be done by polling the document object model (DOM) at certain points in time and also by inserting a javascript into the HTML (before loading) that will run to capture certain events and characteristics of interest.

As noted above, a VR/AR scene may be permitted to animate for a predetermined length of time, e.g., a few seconds, 3 seconds etc., to obtain information about objects that become visible and/or prominent in the VR/AR scene during that time. More detail will be provided below.

The results of the analysis are preferably a set of one or more important objects that should be preferentially served to the client because they are high-priority for rendering the VR/ARscene. The set of objects can be exported in the form of an ordered list that defines a preferred delivery order for the objects. This list is referred to as an object loading list (OLL) and the OLL can be associated with the URL of the HTML and stored in the repository 106, by being stored in a data structure indexed by URL.

Subsequently, assume the content server 102 (or another content server) receives a client request for the same HTML, from the same or different client. The content server 102 can search the repository 106 to find the associated analytical results, the OLL. The content server 102 can apply this object delivery list by, for example, prefetching the objects listed thereon, and/or implementing an HTTP/2 push for those objects in the specified order. More detail about this process will be described below.

Preferably, the content server 102 caches the OLL retrieved from the repository 106 for future use with other requests. Further, in some embodiments that include but not limited to smaller scale deployments, the function of the repository 106 could be integrated into a content server 102 and mirrored across several such servers using a known data consistency strategy.

Figure 2A:
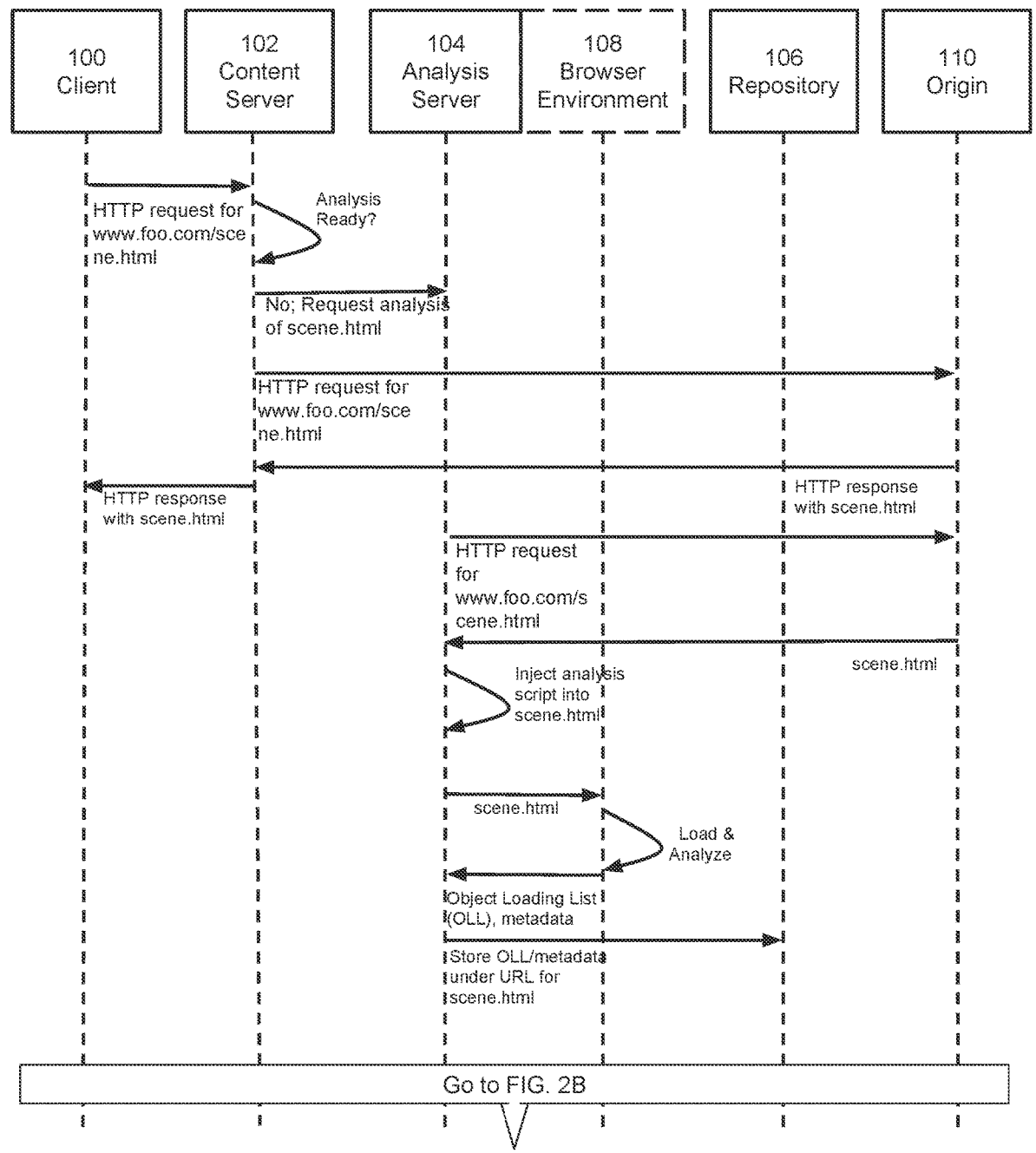
FIGS. 2A and 2B are diagrams illustrating the message flow in the system of FIG. 1.
Figure 2B:
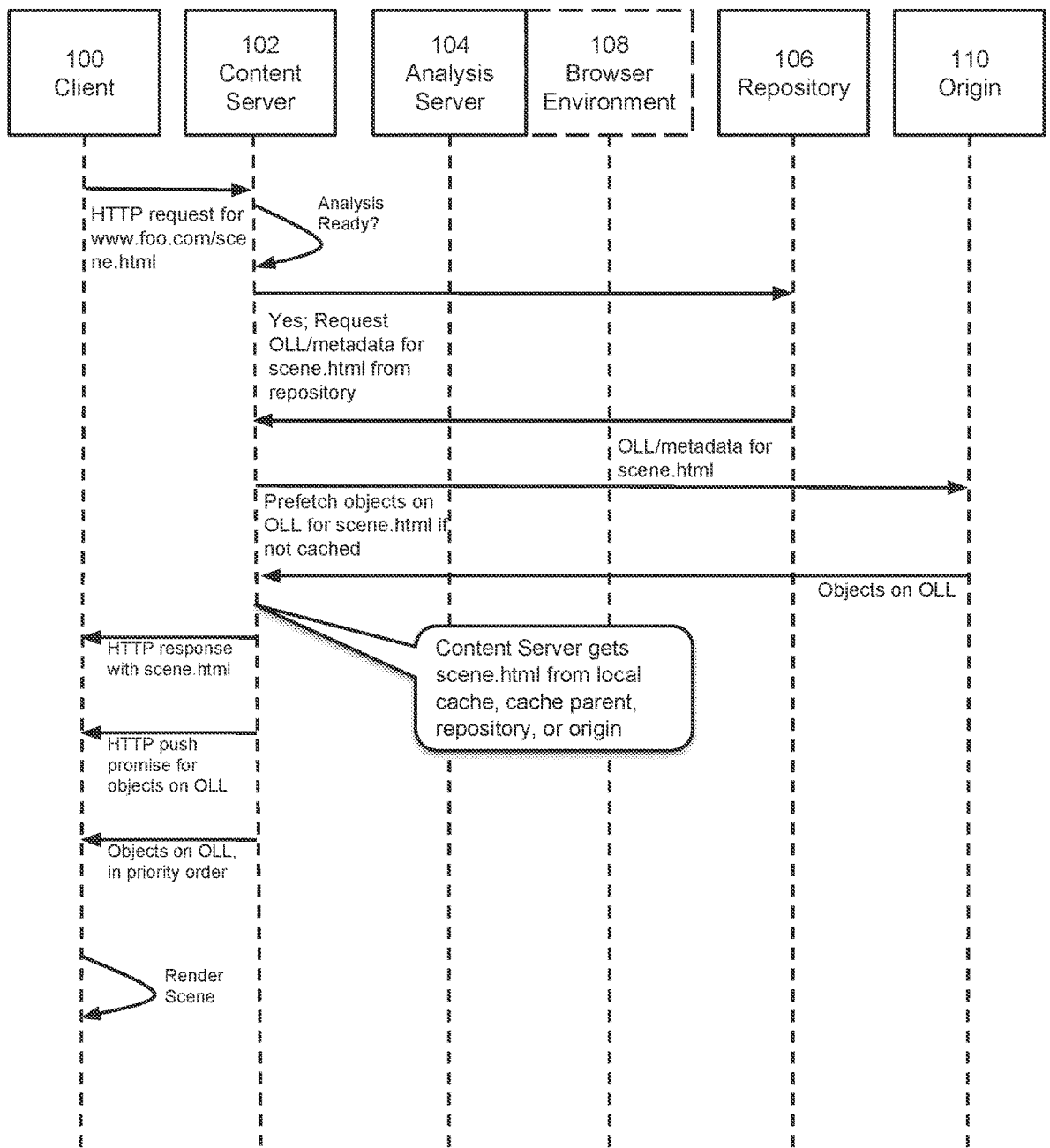

FIGS. 2A-2B are sequence diagrams illustrating one embodiment of the messaging flow in the system of FIG. 1, as just described. FIG. 2A illustrates the messaging amongst components in the system where the HTML document for the example VR/AR scene, represented by 'scene.html', has not yet been analyzed. FIG. 2B illustrates the messaging in the system when the analysis has been completed and is ready for content server 102 to use in response to a subsequent request from clients for the same 'scene.html'.

Analysis of VR/AR Page

The analysis server 104 can analyze a VR/AR enabled page in a variety of ways to produce a prioritized object loading list (OLL) and/or other VR/AR enhancement metadata, all of which can assist the content server 102 in delivering the page to the client 100. Many techniques discussed herein rely on identification of the objects in the user's initial field of view. Hence that process is discussed next.

Identification of Objects of Interest

In a preferred embodiment, the page defined by the HTML is loaded in a browser application, and additional Javascript is injected, either by console injection or static source injection, that performs an identification of elements in the initial field-of-view analysis. A preferred process for the analysis server 104 to conduct the analysis is set forth below. In general, the approach involves identifying objects in the initial or subsequent field of view, and then to collect certain characteristics about these objects. Note that any or all of the below object characteristics below can be collected; the teachings hereof are not limited to any particular characteristics.

1. Register all objects for 3D artifacts that are loaded, such as external images, audio, and video files.
2. Collect field of view (FOV) data, including an identification of both initial and subsequent FOV objects. Scan the objects in the initial camera field-of-view. The analysis may permit the WebVR scene to animate or 'play' over an observation period of, say, 3 seconds, while polling or tracking the scene elements. The time period that the system uses may vary with the web page, content provider, or on the presence of particular WebVR tags or other VR/AR content. This animation period accounts for objects that begin 'off-camera' but animate into the field of view. Such objects may also be considered to be 'in the initial view' or separately categorized. Preferably, the observation period timer starts when an active camera is attached to the scene and the initial field-of-view frustum is ready.
3. Collect angular offset measurements for objects. Many if not all of the objects in the initial FOV will not be in the exact center of the user's FOV. For example, in FIG. 3A, 3B, the user's FOV is depicted by the box 300, and the center of that FOV is depicted by the black dot at 302. The object 304 is off center. The angular offset to the object 304 can be measured as angle between a vector pointing in the direction of the camera (that is, towards the dot 302, into the page) and a vector pointing to the object 304. The angle between the two vectors denote how far (in terms of degrees) the object is from the camera's current direction. This is shown in FIG. 3B, where the vector pointing in the direction of the camera is 306 and the angle is 308. The idea is that one could configure that elements within N degrees/radians of the camera's viewing direction be prioritized for delivery over other elements that are more than N degrees/radians away from the camera's current viewing direction.

Figure 3A:
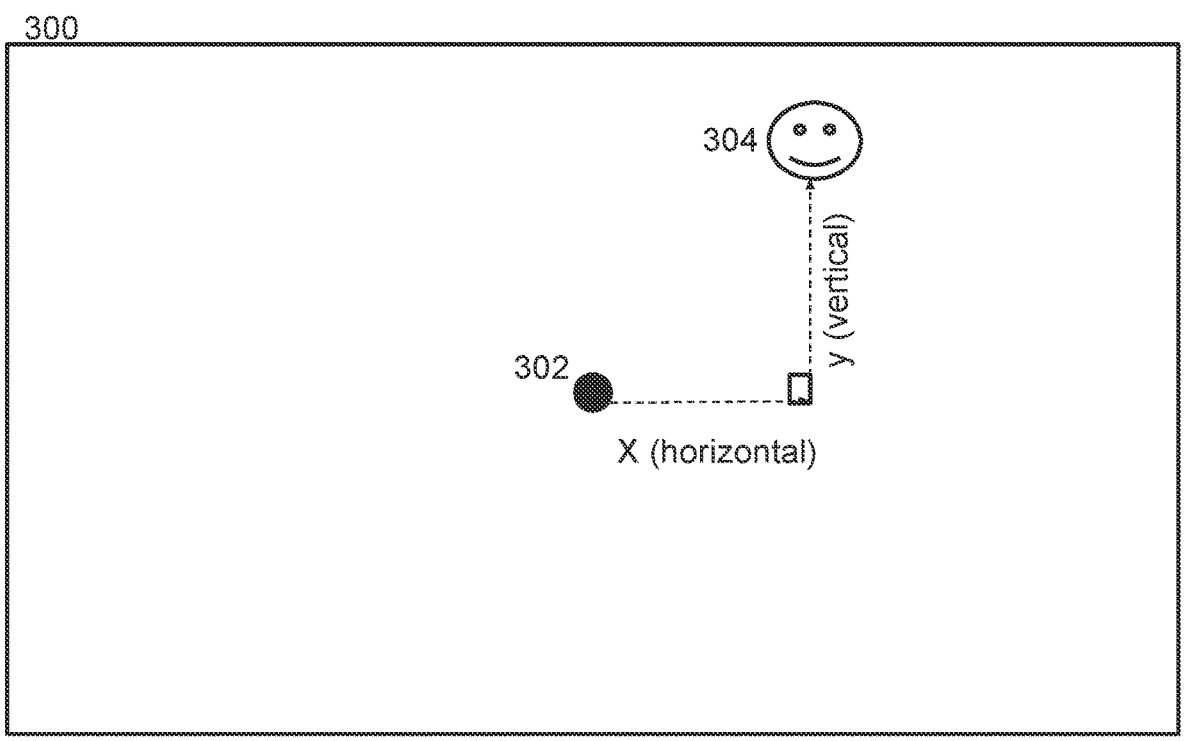
FIGS. 3A-3D are diagrams illustrating the concept of object angular offset in the user's field of view and quadrants.
Figure 3B:
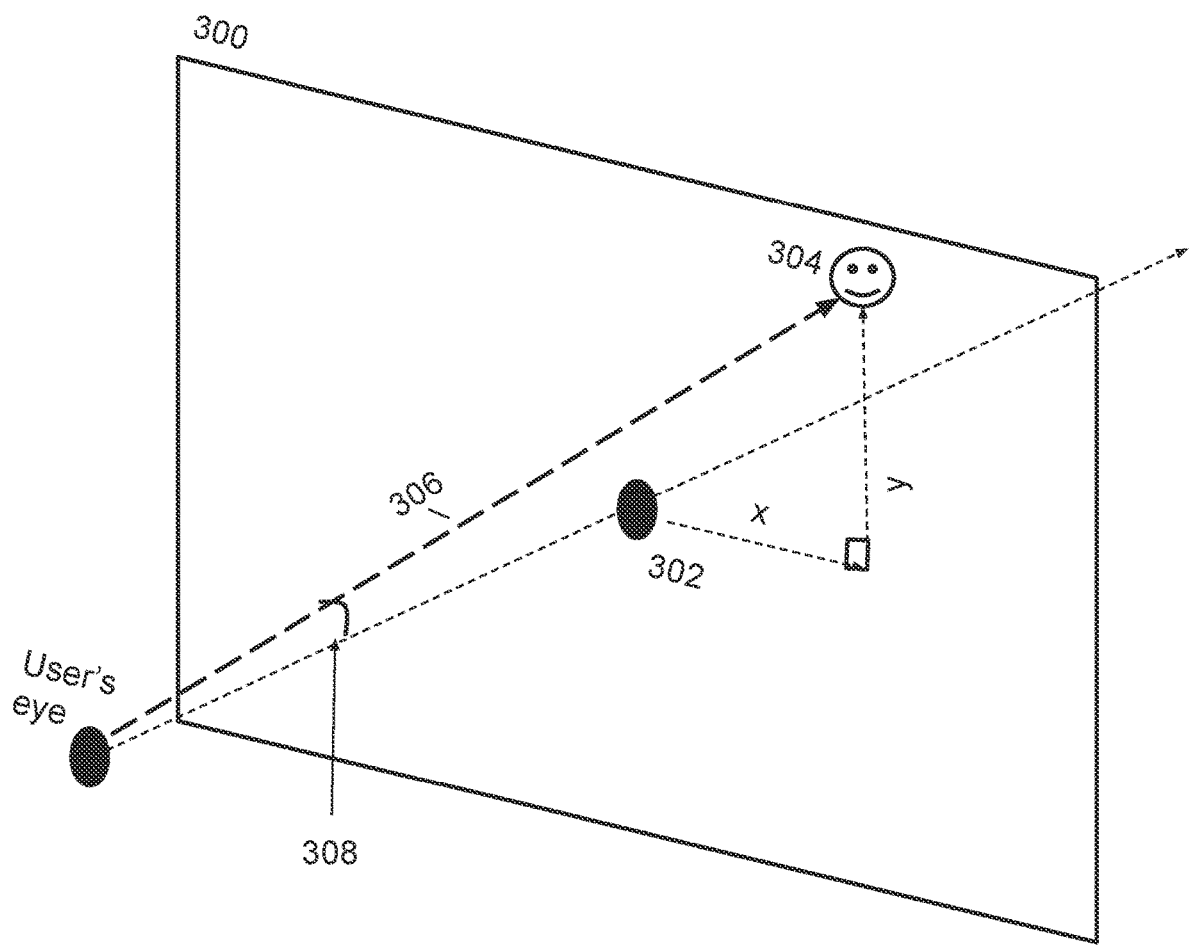
Figure 3C:
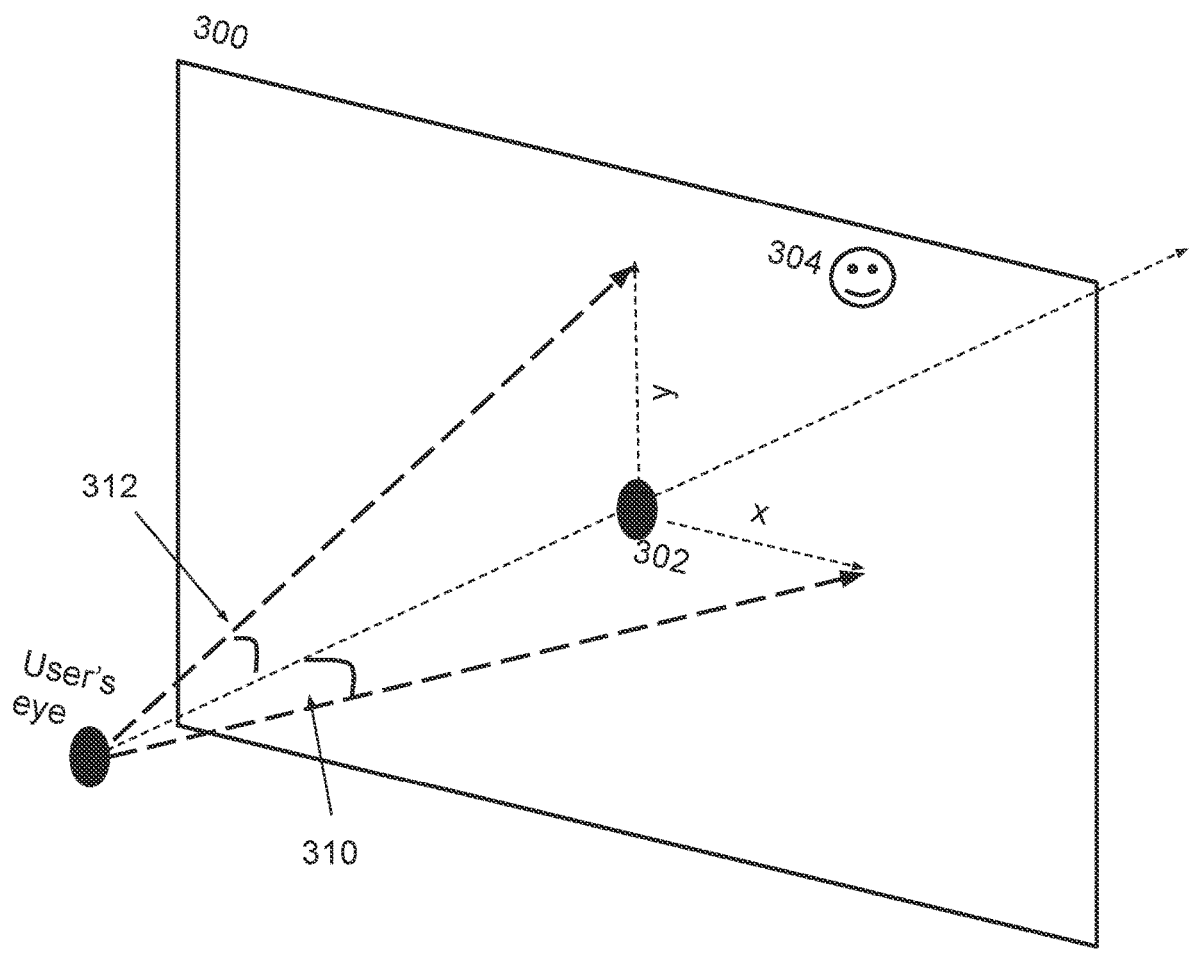
Figure 3D:
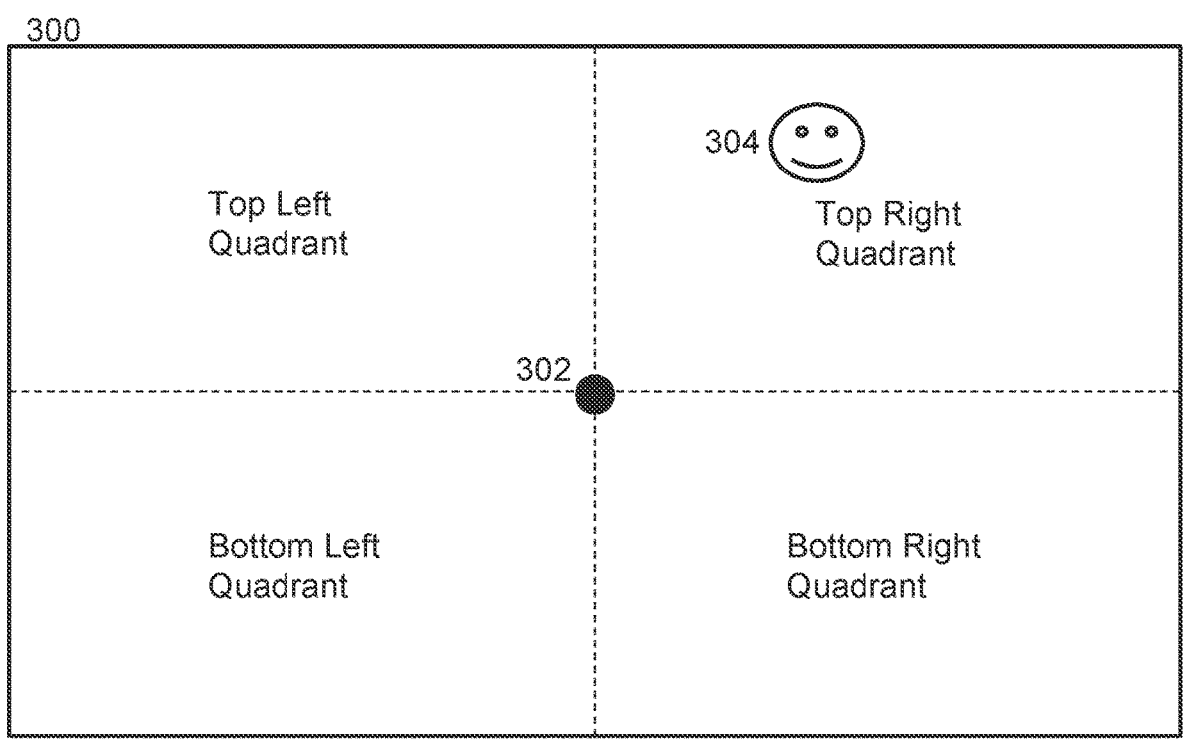

In one embodiment shown in FIG. 3C, the angle is broken down into two components: a horizontal angle (310) based on the horizontal distance x from the center to the object, and a vertical angle (312) reflecting the vertical distance y from the center to the object. In this implementation, the analysis server 104 reports each of these angles separately. The idea here is to allow the system to be configured for devices that have asymmetric screens, e.g., wider or taller screen, such that objects that are N degrees away from the y or x-axis (or any combination of that) be prioritized for delivery. Further, in one embodiment, one could say that objects in, say, a top-left quadrant to be prioritized for delivery before delivering objects in the bottom-left quadrant. The quadrants are based on camera's current field of view, see FIG. 3D.

As those skilled in the art will understand, the "angular offset" for an object could incorporated into scoring in variety of ways. For example, the x, y, z distances could be used. Or one could use the hypotenuse of the right triangle in FIG. 3 and the angle between the x axis and the hypotenuse, along with a separate depth (z) metric. The exact mathematical representation and use of the offset may vary but is still within the scope of the teachings hereof.

4. Collect object apparent size. In some cases, a metric relating to the apparent size of an object in the initial or subsequent FOV can be collected. The apparent size is preferably the largest apparent size achieved by the object during the observation period. Examples of a size metric include: objective in-world volume, rendering size on a two dimensional viewing plane for the camera, or some combination thereof 5. Collect duration of object visibility. The amount of time that an element is visible from the camera in the observation period can also be collected. When an object is occluded from view by another, off-camera, or configured not to display, it would be considered invisible.

6. Collect object data size. The byte size of the image asset that paints an object can also be collected.

Scoring System to Prioritize Delivery of Objects

Having identified the objects of interest and characteristics thereof, such as lowest offset, the analysis server 104 proceeds to prepare an ordered list of some or all objects. The order on the list defines the preferred order in which the objects should be delivered to a client so that they can be loaded in the browser. Put another way, the list defines a delivery/loading priority for each object. There are wide variety of ways to determine object priority and to prepare the list. Some examples of factors that can be used to score the priority are now described.

One factor the can be used in preparing the OLL is the vector distance from the active camera to the object and/or apparent size of the object, such that occluding objects are prioritized above objects having the same or nearly same offset.

A second factor is the byte size of objects. Preferably, small files are prioritized above other objects having the same or nearly same offset; e.g., ascending file size might be a secondary sort factor.

A third factor is whether the object is always present in the initial FOV or it animates into the FOV within a defined period of time, e.g., the first 3 seconds. If the analysis process finds that it is the latter, that object could be scored below other always-present elements in the OLL.

One non-limiting example of a scoring approach is now described. This example takes into account the distance of the object from the camera, the apparent size of the object, whether it is in the initial field-of-view (FOV), the angular offset, and the quadrant in which an object is located. We also provide an option to configure the scoring such that the "sky" can be chosen to be or not to be considered in the scoring. The choice would depend on the configuration provided by the user. This example depends on the above factors and their coefficients as follows:

```
var scoreCoefficients={
    'inFOV': 1,
    'distance': 0.2,
    'apparentSize': 0.7,
    'shortestDegreeFromCamera': −0.9,
    'isNotSky': 0,
    'topLeftQuadrant': 0.8,
    'bottomLeftQuadrant': 0.2,
    'topRightQuadrant': 0.4,
    'bottomRightQuadrant': 0.2,
    'rotationX': −0.5,
    'rotationY': −0.5
};
```

Note that in the above list of coefficients, the term 'rotationX' is referring to the angular offset on the horizontal axis that was described with respect to FIGS. 3A-3C; the term 'rotationY' is referring to the angular offset on the vertical axis that was described with respect to FIGS. 3A-3C;

The coefficients can then be used to calculate the score for an object as follows:

```
var score=(scoreCoefficients.inFOV*map.inFOV)+
    (scoreCoefficients.apparentSize*map.apparantSize)+
    (scoreCoefficients.distance*map.distanceToCamera)+
    (scoreCoefficients.shortestDegreeFromCamera*
    map.shortestDegreeFromCamera)+
    (scoreCoefficients.rotationX*map.rotationFromCamera.x)+
    (scoreCoefficients.rotationY*map.rotationFromCamera.y)+
    (quadrantValue*scoreCoefficients.inFOV);
```

Of course, the above coefficients could be changed for other implementations, by users, etc. Any combination of factors could be Alternative Embodiment Using Real User Measurements For Analysis In another alternative embodiment, the offline analysis described above is performed not with a browser environment internal to the analysis server 104 but instead based on data created from real user measurements. This means that a measurement javascript can be injected into the HTML document by the content server 102 and the resulting modified HTML served to the client 100. The injected script instructs the client browser to record the measurements (e.g., object in initial FOV, quadrant information, apparent size, angular offset, byte size, distance, etc.) for the objects that were described already. The measurements can be taken using the browser's Navigation Timing and Resource Timing functionality, and the WebVR API. The measurement data can be beaconed back to analysis server 104, which can then produce the OLL and other metadata using a scoring approach such as that above.

The system described in U.S. Pat. No. 9,736,258, can be used to implement this approach, and the teachings of that patent are hereby incorporated by reference in their entirety.

Applying the Object Loading List

There are a wide variety of ways in which the OLL, once generated, can be applied by the content server 102. Below are some examples.

When a client requests a WebVR HTML document that is authored for VR/AR, the content server 102 responds with the HTML and—preferably before the response reaches the client 100—the content server 102 can begin transmitting the data for the object that the user will be looking directly ahead at to begin. This data is typically in the form of a skin (e.g., an image resource) for the object. The content server can then serve the skins for the objects around the center of view. The data for objects "behind" the user also can be transmitted; the model of loading intervention need not be "lazy" nor based upon user actions within the VR/AR scene. With this approach, no special changes to the HTML are necessarily required in production. Moreover, no special changes to the WebVR-compatible web browsers/clients are necessarily required.

Generalizing, a content server can (a) transmit certain objects to the client before receiving a client request for them, yielding a smaller time to load the initial field-of-view; (b) apply server push in a prioritized order that enables the browser to paint objects "in front" of the camera faster, thus exploiting the opportunity to use the server push function in HTTP/2 (or other server push protocol).

More details are now provided.

Assume that the analysis server 104 has created the OLL, associated it with the URL of the HTML that was analyzed, and stored it in the repository 106, as was described in connection with FIGS. 1, 2A. Turning to FIG. 2B, when a client 100 requests the HTML from a content server 102, the OLL can be retrieved and the following functionality can be implemented over an HTTP/2 connection based on the OLL:

1. Ordered Push for Objects on OLL. The content server 102 serves, in response to the client request, a series of PUSH_PROMISE frames corresponding to the elements in the OLL. The content server 102 then serves the following:
   a. first, the HTML in full;
   b. next, the HEADERS frame of every promised object in the order defined in the OLL;
   c. next, all necessary DATA frames of every promised object in order defined in the OLL. If the data for an object in the OLL is not ready (e.g., not in cache, needs to be fetched, etc.), the content server 102 proceeds to the next object while waiting for higher-priority object data, and returns to the higher-priority data when available (possibly subject to a sanity check minimum data length—in other words, small objects might be skipped if they are not ready after some time). As a reminder, the term 'priority' used here relates to a judgement of ordered transmission and not a weight. It may be possible for the content server 102 to more easily organize this behavior, or for the system to exploit already-available features, by considering each promised object in the OLL to be dependent on the object before it, with the first one being dependent on the HTML document object. The priority scheme is expressed in HTTP/2 terms, per the HTTP/2 specification, and accordingly HTTP/2 compliant web servers will enforce the priority scheme.
   In some cases, it is possible that multiple objects in the OLL are equally dependent on the HTML and thus no preference amongst them could be given on that basis. In such scenarios, an HTTP/2-capable content server could be configured to transfer a few objects in parallel. If an object was found to be very large in byte size during offline analysis, this treatment could be conditional, and designed so that a very large object will only use, for example, 50% of the priority weight while in-flight, allowing concurrent transmission of other objects, but afterwards the remaining objects go back to serial fashion.
2. Small/Large Object Segregation Over Plural Connections. It is possible that there are many small and large objects in the OLL with equal priority weight and that transferring all OLL such objects in parallel could slow down downloads of all objects (even the small ones). Therefore, in one variant of a content server 102 implementation, the delivery of the VR/AR webpage can be configured to allow transfer of all small objects on the OLL onto one HTTP/2 connection and large objects from the OLL on one or more additional HTTP/2 or HTTP/1.1 connections. Such an approach allows progress on delivering objects on the OLL without letting a very large object hinder progress on smaller objects below or above it on the OLL. The separation of small and large objects onto different connections could be achieved by leveraging our previous work on strategically employing smart-sharding for HTTP/2-enabled webpages. The previous work is Goel et al., "Domain-Sharding for Faster HTTP/2 in Lossy Cellular Networks", Technical Report, July 2017, arXiv:1707.05836v1 (at arxiv.org). That work describes a sharding technique that isolates large and small object downloads on separate TCP connections when using HTTP/2.
3. Suppressing an OLL Object Push. The content server 102 may use the presence of a cookie or other knowledge to suppress the push for an OLL-listed object that appears across several WebVR pages, particularly when the client has already visited the URL recently. This is a known technique in the industry for enhancing the effectiveness of push (by mitigating 'wasted' pushes that must be cancelled by the receiving client); Akamai Technologies provides it in a product known as Adaptive Acceleration.
4. Objects Not On OLL; Multiple OLLs. The VR/AR page may reference, and the content server 102 may have locally available, other VR/AR objects that the browser needs to establish the VR/AR framework, such as the WebVR API (a JS file), an A-Frame library (aframe.io), as well as page artifacts such as logos and images used in a web page structure around the VR/AR object(s). Those objects can, of course also be pushed, and that server push might precede the server push of the OLL in-scene artifacts. Put another way, there may be multiple OLLs, one from the analysis process described herein, and other declared from other libraries and/or otherwise. That might be expressed in HTTP/2 terms by making the first item on the OLL from the analysis dependent on another file, e.g., the largest pre-OLL file, or on another OLL declared elsewhere.
5. Sky images. A 'sky' skin image may be treated in a special manner. It is likely to be on the OLL because it will be registered as an object in the FOV during the offline analysis. It may be treated as high or low priority in the OLL depending on a configuration choice at the analysis server 104, with a default of low or high priority, the byte size of the sky's skin image file, and/or an analysis of how much sky is visible in the initial FOV based on scene geometry, if any. It is also possible that these special considerations can be applied at the content server 102 by overriding the priority position that the analysis server 104 assigned to the sky image in the OLL. It should be understood that the special treatment of the 'sky' image applies only to VR pages, because AR pages use a live camera feed as a background, not a virtual sky. Furthermore, it should be understood that in some embodiments, the system could be configured to exclude the sky image from the object scoring system for a VR page. This might be done because in some scenes the sky has relatively few interesting features or it may be very low value (e.g., the objects in front of it may be more important).

6. Ordered Early Hints Instead Of Ordered Server Push. For an HTTP/1.1 connection, or in lieu of server push, Early Hints may be employed instead of HTTP/2 server push. In this case, a client would then exercise logic to decide whether to request the early-hinted items and would be free to make those requests within a priority scheme of its own choosing. To exert control over the order and priority, the content server 102 could order the hints in the sorted order described above to allow a simplistic ordered set of requests to be approximately correct, although the responses may then come in parallel rather than in sequence. Furthermore, in another embodiment, the content server 102 can use both early-hints and server pushes (e.g., on a HTTP/2 connection). To do this, the content server 102 can can choose to early-hint the objects not in the OLL and use push to send objects in the OLL.

Figure 4:
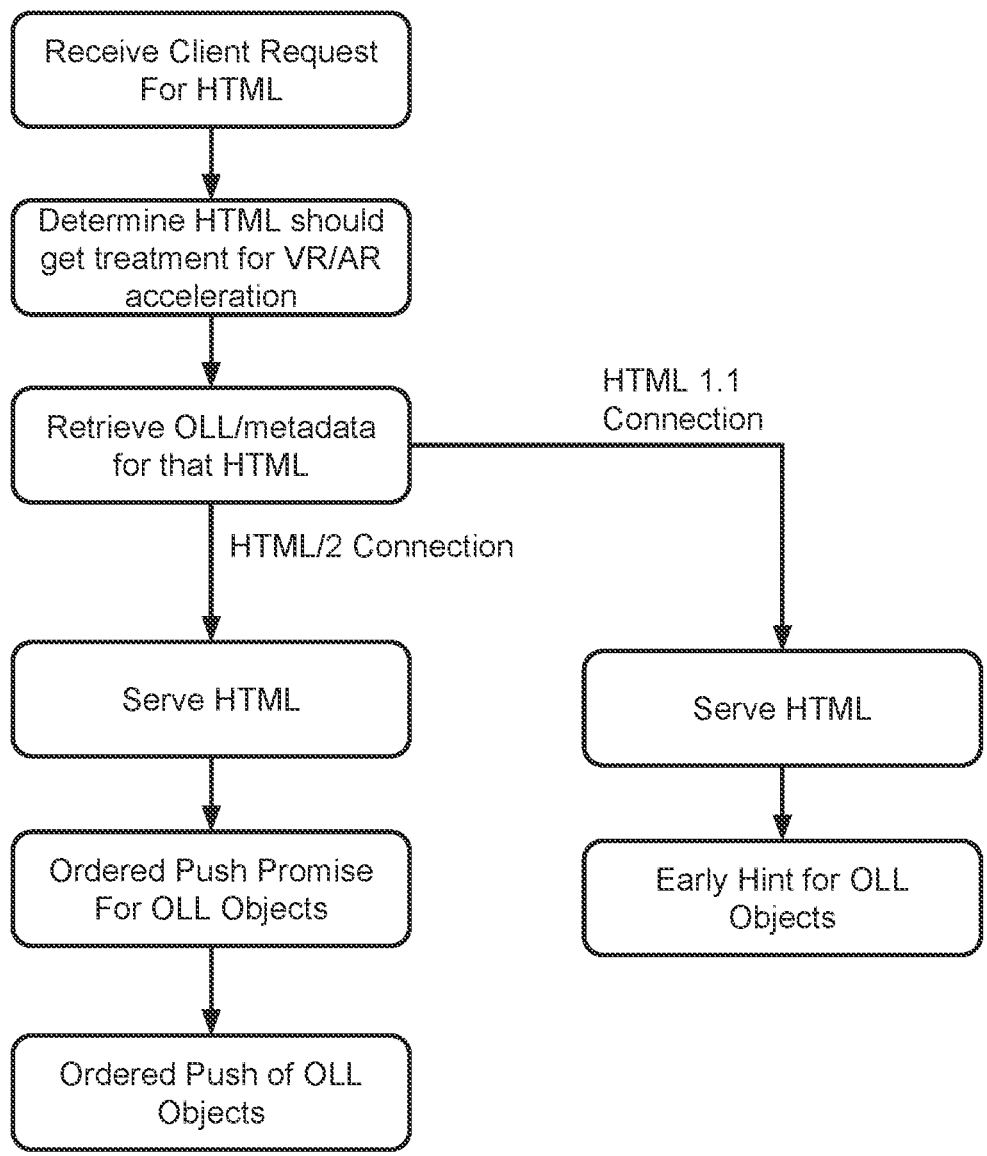
FIGS. 4 and 5 are diagrams illustrating processing steps for applying the OLL at a content server shown in FIG. 1; and, FIG. 6 is a block diagram illustrating hardware in a computer system that may be used to implement the teachings hereof.

A high-level summary of content server 102 operation is provided in graphical form as FIG. 4. As those skilled in the art will understand, there are a wide variety of possible implementations that can be used while remaining within the scope of the teachings of this patent document.

Additional Enhancements to VR/AR Pages

Figure 5:
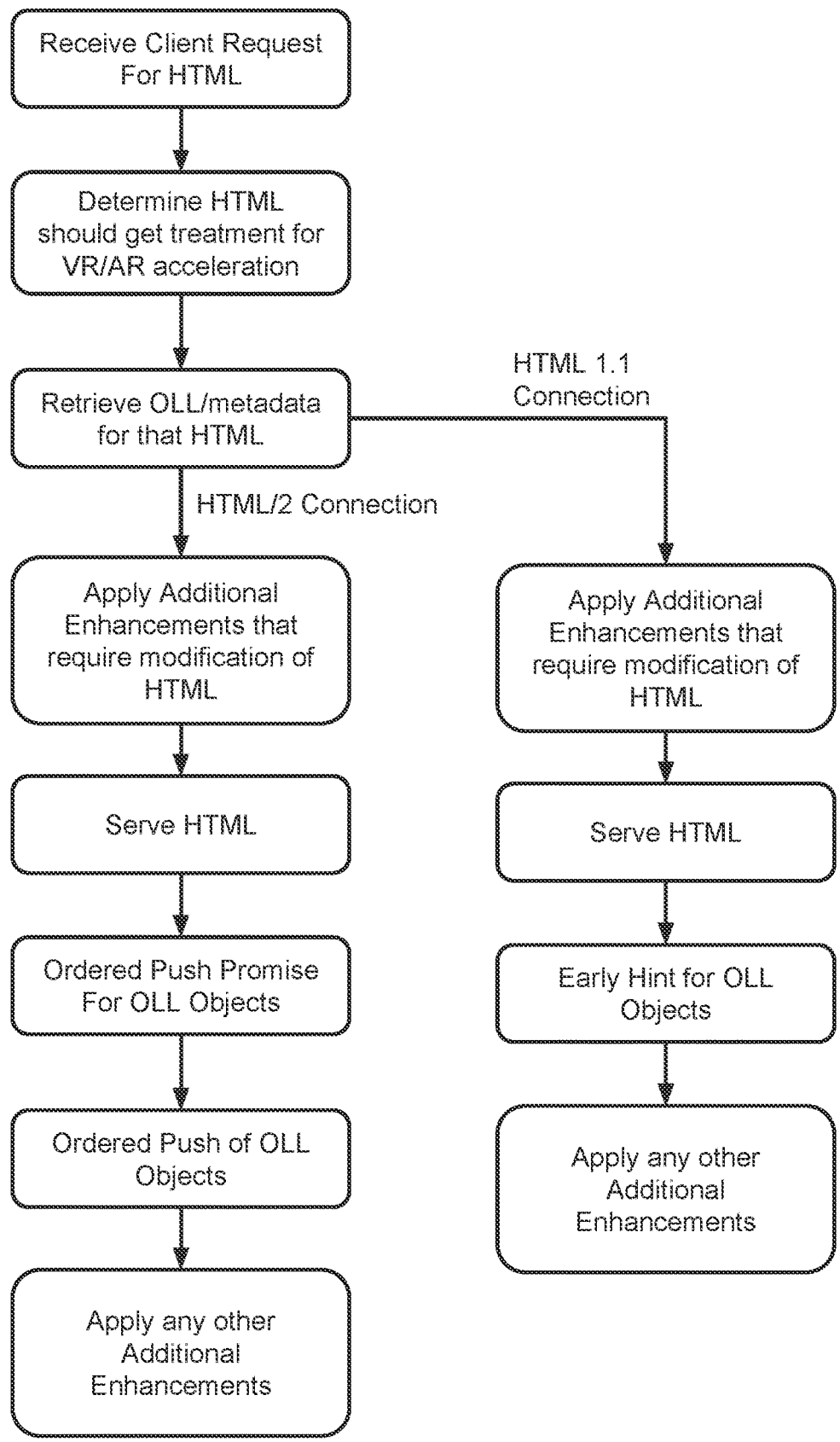

The system described herein can be leveraged to provide other enhancements as well. This is shown in FIG. 5 as the added "Apply Additional Enhancements" steps in an alternative embodiment of content server 102 operation. Such additional enhancements may or may not rely on the offline analysis of the HTML; some may take advantage of the content server's opportunity to parse and/or modify a HTML document synchronously to the client request.

Presented below are several potential additional enhancements, including: Image Processing For Power of Two Resolutions, Sky Image Optimization, Far Object LQIP, Asset List Declaration Enhancement, and Grouped Object Fetch.

Additional Enhancements: Image Processing For Power of Two Resolutions when using WebVR Technical Problem: when image resolutions are not in the power of two, a WebVR API running on the client (e.g., three.js, which uses WebGL) spends some time to convert the image into a resolution that is a power of two. The conversion process slows down the rendering process for that image at runtime. One could observe example behavior of WebGL in a web browser's console as "THREE.WebGLRenderer: image is not power of two (1280×640). Resized to 1024×512". This means that the original image of resolution 1280×640 was converted to a resolution 1024×512, which is the closest lower-resolution power-of-two image.

To address the above problem, the content server 102 can leverage an image re-sizing service to prepare convert images into power of two formats. Specifically, an image resizing service, such as Akamai's Image Manager, can be used to prepare images with graphical dimensions in the power of two (eg. 64×64, 512×512, 128×1024) for WebVR web pages, such that the new power-of-two image either follows the aspect ratio of the original image or is a lower-resolution image closest to the resolution of the original image. Once the converted image is ready, the content server 102 can be configured to serve the converted image instead of the original image. For example, the content server 102 can fetch the converted image on-demand from the image manager infrastructure. Put another way, when an image object is encountered on the OLL, the content server 102 uses the converted image for server push, rather than the original image obtained from origin 110. With reference to FIG. 2B, the serving of the converted image would occur at the point where the data for the objects on the OLL are pushed to the client.

Additional Enhancements: Sky Image Optimization

Technical Problem: In VR, including in particular WebVR specifications, a 360 degree background imagery is called a sky. Delivery of a sky image can slow down the loading of objects in the user's field of view. Currently, there is no known technique for how to deliver a large sky image along with other things on the VR page without degrading the load time of elements in the initial FOV. The sky image inside a scene is typically a single image. Oftentimes, to render a quality background image, a very high resolution image is used for the sky. The image could be several MB in size. Such a large image could take hundreds of milliseconds on a device connected to a high-speed wired broadband network and couple of seconds on a (slow-speed) mobile/Wi-Fi network.

To address the above problem, the system can provide virtual sky tiling with partial low-quality image placeholders (LQIP). More specifically, the system can prepare a sky images that have high resolution in the user's initial field-of-view but low resolution elsewhere. An alternative to this approach is to put white pixels in the areas not in the initial field-of-view, which data can be greatly compressed in size, resulting in much faster client delivery and load.

Preferably, the system establishes multiple concentric spheres (all surrounding the VR scene as the sky object does), each being a sky-sphere with a particular resolution. Only one of the skies be visible at a time. This technique would allow us to initially load the sky sphere with an image that has high resolution in the areas in the initial FOV and in the background (as low priority) have other sky-spheres load different sky images that have high resolution pixels in other areas of the sphere, including the area that was in the initial FOV. Once the initial sky image with the high resolution in the initial FOV has loaded on the client, the system could create multiple concentric sky spheres that progressively load the original sky image with image resolution increasing for areas not in the field of view. For example, in the first concentric sphere closest to the camera, we load an image with high resolution for pixels in the initial FOV and low resolution elsewhere, or alternatively, a solid color. In the next concentric sphere, we load another version of the sky image such that this image has high resolution both in the initial FOV and some areas not in the field-of-view, and low resolution elsewhere. Alternatively, only one sky-sphere could be used to update the sky image, such that initially the sky loads the image with high resolution in the area of initial FOV, but after other elements of interest complete loading, the sky is configured to update its image and load an image that has high resolution in other areas as well. Note that this sky-optimization technique requires a script to be run on real client devices.

This progressive image loading technique is preferably implemented by the content server 102 inserting javascript into the HTML before serving it to the client.

Additional Enhancements: Far Object LQIP

Technical problem: objects in the VR/AR scene could be placed far from the camera. In such circumstances, delivering the object with high quality even though the its apparent size is small could unnecessarily slow down the loading of the VR/AR webpage.

To address the above problem, the content server 102 could serve low quality image placeholders (LQIP) for objects that are sufficiently far away. At the request of a content server 102, an image manager service can prepare reduced resolution images for objects whose apparent size in the WebVR webpage is small. The content server 102 can decide whether an object is considered far and/or small based on configured thresholds. The content server 102 can then serve the low resolution images instead of the full size images, during the OLL object push or whenever the full image is requested by a client. In an alternate embodiment, once everything critical on the page has finished loading, the content server 102 can arrange for the client to fetch higher resolution images for distant images, e.g., using a script inserted directly or via link in the HTML document. This technique is based on injected Javascript to the production HTML that the client executes to fetch for higher resolution images. Specifically, the content server 102 can inject a script to the HTML document that could make the needed ajax calls to fetch higher resolution images after the onLoad event or after elements in the FOV have been downloaded. Additionally, for small images, the server can choose to encode the image data in the HTML itself, which is sometimes referred to as inlining the content.

Additional Enhancements: Asset List Declaration Improvement

Technical Problem: The WebVR toolkit allows developers to declare a list of assets in HTML. The list is intended to represent assets that might be referenced later in the HTML. So instead of specifying a URL in the src attribute of an a-frame element, an id of an asset could be provided in the src attribute. For example:

<a-assets>
  <img id="mercury-image" src="img/mercury.jpg">
  <img id="venus-image" src="img/venus.jpg">
</a-assets>
<a-sky id="planet-mercury" src="#mercury-image" rotation="28 0 20"></a-sky>

The problem with a-assets is that the end user's browser loads them in the order it parses the HTML, even if the asset is not referenced anywhere in the HTML. Whereas, for fonts used in regular websites, browsers don't load the font until it parses an element on which the font needs to be applied. Hence, if the assets in the a-assets are mentioned in an order that is not optimized for accelerating the display of the objects in the initial FOV, the end-user's browser will spend resources and time downloading non-critical assets and potentially slow down downloads for critical resources.

To address the above problem, the system can examine the list of a-assets and take steps to ensure those assets are early-hinted or pushed in an order that the content server 102 prefers. For example, because the OLL can be prepared based upon what lies in the initial FOV for devices with different screen sizes/orientation, the content server 102 could consult the OLL and change the order of loading the asset list, by pushing those objects in the order defined by the OLL for faster initial FOV load time. This results in a revised asset list in the HTML. This process can take place after retrieving the OLL and before the HTML document is served, i.e., before 'scene.html' is served in FIG. 2B. Further, if the analysis server 104 determines that there is an asset in the asset list that is not referenced anywhere in the a-frame HTML in the rest of document, it could include that fact with the OLL, e.g., as metadata for the OLL. That would alert the content server 102 that it should re-order that asset from the asset list, preferably to the end of the list, and also make sure that such elements be not pushed before any other element that is needed on the page.

Push promise and/or Early Hint can be used to implement this enhancement. With push promise, the content server 102 can control the timing of transfers and start immediately with the most important asset. With Early Hints, the server may imply an order, but the standard lacks rich prioritization expressiveness. Hence, the client will request assets in an order it determines, and may simultaneously request all assets, which may not be as advantageous (although a sufficiently sophisticated server could still detect this and mitigate, it requires less logic and state to do so with server push).

Additional Enhancements: Grouped Object Fetch

Technical problem: The WebVR specification allows elements to be part of a 'group' that can, by default, be configured to render together on the screen. For example, <a-entity id="parent">
  <a-plane id="child1", position=""src="img/abc.jpg" width="3" height="2"></a-plane>
  <a-plane id="child2", position=""src="img/xyz.jpg" width="3" height="2"></a-plane>
</a-entity>

In the above example, the two planes are children of an entity element with id equals parent. To produce immersive VR experiences, when the parent is rendered, the two children objects should also be rendered as fast as possible. However, browsers do NOT hint the servers about such groups and therefore servers today do not optimize delivery of grouped objects.

To address the above problem, the content server 102 can be configured to push a group of objects properly. The analysis server 104 can identify groups of parent and children objects and include such group information as metadata with the OLL for the HTML. The content server 102, upon consulting retrieving the OLL and consulting the group information, can be configured to push or early-hint the children in the group when the content server 102 sees a client request for the parent. More specifically, whenever the content server 102 chooses to push or early hint one of these parent objects, it should automatically push or early hint the other "sibling" children objects as well.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 6:
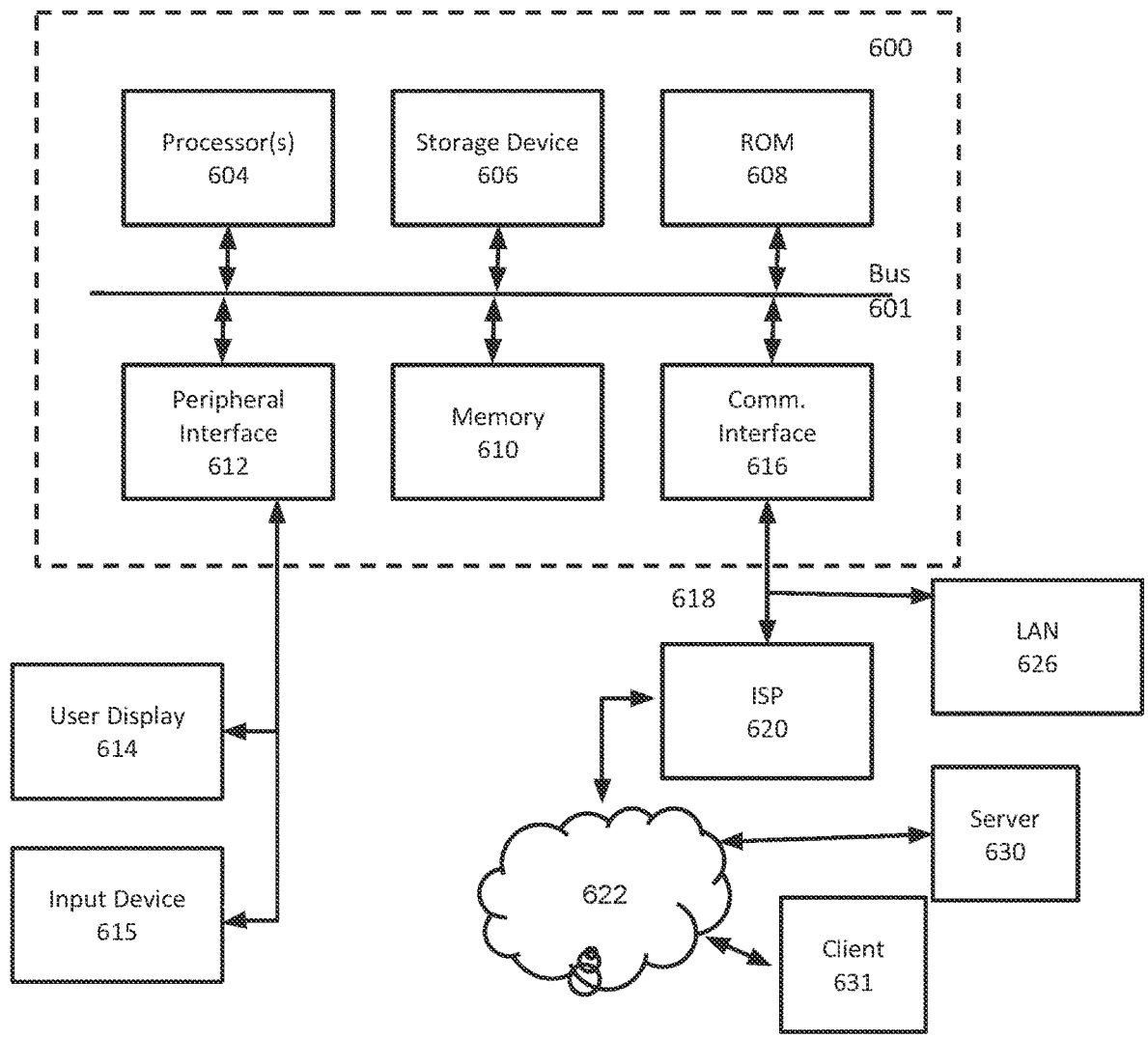

FIG. 6 is a block diagram that illustrates hardware in a computer system 600 upon which such software may run in order to implement embodiments of the invention. The computer system 600 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 600 includes a microprocessor 604 coupled to bus 601. In some systems, multiple processor and/or processor cores may be employed. Computer system 600 further includes a main memory 610, such as a random access memory (RAM) or other storage device, coupled to the bus 601 for storing information and instructions to be executed by processor 604. A read only memory (ROM) 608 is coupled to the bus 601 for storing information and instructions for processor 604. A non-volatile storage device 606, such as a magnetic disk, solid state memory (e.g., flash memory), or optical disk, is provided and coupled to bus 601 for storing information and instructions. Other application-specific integrated circuits (ASICs), field programmable gate arrays (FPGAs) or circuitry may be included in the computer system 600 to perform functions described herein.

A peripheral interface 612 communicatively couples computer system 600 to a user display 614 that displays the output of software executing on the computer system, and an input device 615 (e.g., a keyboard, mouse, trackpad, touch-screen) that communicates user input and instructions to the computer system 600. The peripheral interface 612 may include interface circuitry, control and/or level-shifting logic for local buses such as RS-485, Universal Serial Bus (USB), IEEE 1394, or other communication links.

Computer system 600 is coupled to a communication interface 616 that provides a link (e.g., at a physical layer, data link layer,) between the system bus 601 and an external communication link. The communication interface 616 provides a network link 618. The communication interface 616 may represent a Ethernet or other network interface card (NIC), a wireless interface, modem, an optical interface, or other kind of input/output interface.

Network link 618 provides data communication through one or more networks to other devices. Such devices include other computer systems that are part of a local area network (LAN) 626. Furthermore, the network link 618 provides a link, via an internet service provider (ISP) 620, to the Internet 622. In turn, the Internet 622 may provide a link to other computing systems such as a remote server 630 and/or a remote client 631. Network link 618 and such networks may transmit data using packet-switched, circuit-switched, or other data-transmission approaches.

In operation, the computer system 600 may implement the functionality described herein as a result of the processor executing code. Such code may be read from or stored on a non-transitory computer-readable medium, such as memory 610, ROM 08, or storage device 06. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 18 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The material in the following computer program listing is incorporated by reference into this specification: filename: 18157882_example_code.txt'; size: 16 kilobytes; date of creation: Sep. 15, 2023. The computer program listing was electronically submitted to the Office as a text file on Sep. 15, 2023. The computer program listing contains an example of javascript code that can be inserted into an HTML, document by the analysis server 104 in order to make some of the measurements and/or determinations that are referred to above. Specifically, the objects in the FOV can be determined, along with other things like apparent size.

The invention claimed is:

1. A method performed by one or more servers, each of which comprises circuitry forming one or more processors and memory storing instructions for execution on the one or more processors, the method comprising:
   receiving a request from a client device for a markup language document usable by the client device to create a VR/AR experience, which comprises any of a virtual reality (VR) and augmented reality (AR) experience;
   modifying the markup language document by inserting client-executable code therein, the client-executable code comprising instructions to cause the client device to:
      (i) collect a measurement for an object in a field-of-view in the VR/AR experience, as created by the client device based on the markup language document; and
      (ii) send the measurement to the one or more servers;
   sending the markup language document, as modified, to the client device;
   analyzing the measurement to determine a loading priority for the object; and,
   in response to subsequent requests for the markup language document, taking an action to enforce the loading priority for the object.

2. The method of claim 1, wherein the measurement comprises any of:
   a distance of the object from a center of the field-of-view,
   an apparent size of the object,
   a depth to the object, and
   an angular offset of the object.

3. The method of claim 1, wherein the field-of-view is an initial field-of-view.

4. The method of claim 1, wherein the field-of-view is a subsequent field-of-view revealed after animation from an initial field-of-view.

5. The method of claim 1, wherein the markup language document comprises at least one of a WebVR tag and a WebVR attribute.

6. A system, comprising one or more servers in a content delivery network, each of the one or more servers comprising circuitry forming at least one processor and memory storing instructions for execution on the at least one processor to operate the system as set forth below:
- receive a request from a client device for a markup language document usable by the client device to create a VR/AR experience, which comprises any of a virtual reality (VR) and augmented reality (AR) experience;
- modify the markup language document by inserting client-executable code therein, the client-executable code comprising instructions to cause the client device to:
  - (i) collect a measurement for an object in a field-of-view in the VR/AR experience, as created by the client device based on the markup language document; and
  - (ii) send the measurement to the system;
- send the markup language document, as modified, to the client device;
- analyze the measurement to determine a loading priority for the object; and,
- in response to subsequent requests for the markup language document, take an action to enforce the loading priority for the object.

7. The system of claim 6, wherein the measurement comprise any of:
- a distance of the object from a center of the field-of-view,
- an apparent size of the object,
- a depth to the object, and
- an angular offset of the object.

8. The system of claim 6, wherein the field-of-view is an initial field-of-view.

9. The system of claim 6, wherein the field-of-view is a subsequent field-of-view revealed after animation from an initial field-of-view.

10. The system of claim 6, wherein the markup language document comprises at least one of a WebVR tag and a WebVR attribute.

11. A non-transitory computer readable medium holding computer program instructions for execution on at least one hardware processor, the computer program instructions comprising instructions to:
- receive a request from a client device for a markup language document usable by the client device to create a VR/AR experience, which comprises any of a virtual reality (VR) and augmented reality (AR) experience;
- modify the markup language document by inserting client-executable code therein, the client-executable code comprising instructions to cause the client device to:
  - (i) collect a measurement for an object in a field-of-view in the VR/AR experience, as created by the client device based on the markup language document; and
  - (ii) send the measurement;
- send the markup language document, as modified, to the client device;
- analyze the measurement to determine a loading priority for the object; and,
- in response to subsequent requests for the markup language document, take an action to enforce the loading priority for the object.

\* \* \* \* \*